United States Patent
Ishii et al.

(10) Patent No.: US 10,807,758 B2
(45) Date of Patent: Oct. 20, 2020

(54) DELAMINATION CONTAINER AND PREFORM

(71) Applicants: Yusuke Ishii, Tokyo (JP); Yuichi Okuyama, Tokyo (JP)

(72) Inventors: Yusuke Ishii, Tokyo (JP); Yuichi Okuyama, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 98 days.

(21) Appl. No.: 16/079,016

(22) PCT Filed: Feb. 2, 2017

(86) PCT No.: PCT/JP2017/003852
§ 371 (c)(1),
(2) Date: Aug. 22, 2018

(87) PCT Pub. No.: WO2017/169099
PCT Pub. Date: Oct. 5, 2017

(65) Prior Publication Data
US 2019/0031386 A1 Jan. 31, 2019

(30) Foreign Application Priority Data
Mar. 31, 2016 (JP) ................... 2016-072557

(51) Int. Cl.
*B65D 1/02* (2006.01)
*B29C 49/22* (2006.01)
(Continued)

(52) U.S. Cl.
CPC .......... *B65D 1/0215* (2013.01); *B29B 11/14* (2013.01); *B29C 49/22* (2013.01); *B65D 1/02* (2013.01);
(Continued)

(58) Field of Classification Search
CPC .... B65D 1/0215; B65D 1/0276; B65D 25/16; B65D 83/0055; B29C 49/22; B29C 49/06; B29B 11/14; B32B 7/06; B67D 1/0462
(Continued)

(56) References Cited

U.S. PATENT DOCUMENTS 4,646,925 A * 3/1987 Nohara ............... B29C 45/1643
215/12.2
5,464,106 A * 11/1995 Slat ..................... B29C 49/0073
215/12.1
(Continued)

FOREIGN PATENT DOCUMENTS

EP 1 344 618 A1 9/2003
JP H05-310265 A 11/1993
(Continued)

OTHER PUBLICATIONS

Oct. 2, 2018 International Preliminary Report on Patentability issued in International Patent Application No. PCT/JP2017/003852.
(Continued)

*Primary Examiner* — Robert J Hicks
(74) *Attorney, Agent, or Firm* — Oliff PLC (57) ABSTRACT

A delamination container includes an engaging protrusion that is provided in an area extending over at least a ground contact portion and a recess and protrudes from either one of an outer layer body and an inner layer body and engages with the other in an undercutting manner. Further, a preform includes an engaging protrusion that is provided in an area extending from at least a boundary between a bottom and a trunk to just before an axial center of the bottom and protrudes from either one of an outer body and an inner body and engages with the other in an undercutting manner.

6 Claims, 7 Drawing Sheets

(51) Int. Cl.
  *B29B 11/14* (2006.01)
  *B29K 23/00* (2006.01)
  *B32B 7/06* (2019.01)
  *B65D 25/16* (2006.01)
  *B67D 1/04* (2006.01)
  *B29C 49/06* (2006.01)
  *B65D 83/00* (2006.01)
  *B29L 9/00* (2006.01)
  *B29B 11/08* (2006.01)
  *B29K 67/00* (2006.01)
  *B29L 31/00* (2006.01)

(52) U.S. Cl.
  CPC ........... *B65D 1/0276* (2013.01); *B29B 11/08* (2013.01); *B29B 2911/143* (2013.01); *B29B 2911/1408* (2013.01); *B29B 2911/14053* (2013.01); *B29B 2911/14066* (2013.01); *B29B 2911/14093* (2013.01); *B29C 49/06* (2013.01); *B29K 2023/06* (2013.01); *B29K 2023/086* (2013.01); *B29K 2023/12* (2013.01); *B29K 2067/003* (2013.01); *B29L 2009/001* (2013.01); *B29L 2031/7158* (2013.01); *B32B 7/06* (2013.01); *B65D 25/16* (2013.01); *B65D 83/0055* (2013.01); *B67D 1/0462* (2013.01)

(58) Field of Classification Search
  USPC ......... 215/12.2, 12.1, 382; 220/62.22, 62.12, 220/62.11
  See application file for complete search history.

(56) References Cited

U.S. PATENT DOCUMENTS

| | | | | |
|---|---|---|---|---|
| 6,670,007 | B1* | 12/2003 | Safian | B29C 49/22 215/11.3 |
| 9,511,892 | B2* | 12/2016 | Hosokoshiyama | B65D 1/0276 |
| 2004/0074904 | A1* | 4/2004 | Share | C08L 29/04 220/62.22 |
| 2009/0230074 | A1* | 9/2009 | Toyoda | B65D 1/0215 215/12.2 |
| 2016/0236820 | A1* | 8/2016 | Paauwe | B65D 25/16 |
| 2017/0305122 | A1* | 10/2017 | Akiyama | B65D 47/06 |

FOREIGN PATENT DOCUMENTS

| | | |
|---|---|---|
| JP | H08-198233 A | 8/1996 |
| JP | 2003-137248 A | 5/2003 |
| JP | 2005-212392 A | 8/2005 |
| JP | 2009-179403 A | 8/2009 |
| JP | 2012-116516 A | 6/2012 |
| JP | 2014-046966 A | 3/2014 |
| JP | 2014-088004 A | 5/2014 |

OTHER PUBLICATIONS

Oct. 21, 2019 Extended Search Report issued in European Patent Application No. 17773648.5.
Sep. 10, 2019 Office Action issued in Japanese Patent Application No. 2016-072557.
Mar. 28, 2017 International Search Report issued in International Patent Application No. PCT/JP2017/003852.
May 12, 2020 Office Action issued in Japanese Patent Application No. 2016-072557.

\* cited by examiner

DELAMINATION CONTAINER AND PREFORM

TECHNICAL FIELD

The present disclosure relates to a synthetic resin delamination container including an outer layer body and an inner layer body laminated on an inner surface of the outer layer body and a resin preform used for blow molding of the delamination container.

BACKGROUND

Conventionally, as a container for holding food seasonings such as soy source and beverages, or cosmetics such as skin lotion and toiletries such as shampoo, rinse and liquid soap as a content liquid, a delamination container also called as a peelable laminated container is known (see, for example, PTL1).

Such a delamination container has a double structure in which a volume-reducible and deformable inner layer body including a space for holding a content liquid is peelably laminated on an inner surface of an outer layer body. The outer layer body has a tubular mouth, a trunk connected to the mouth and a bottom configured to block a lower end of the trunk and forms an outer shell of the container. The container is used as a squeeze type dispensing container combined with a dispensing cap with a check valve or as a container with pump combined with a pump. In this case, a content liquid can be dispensed outside by squeezing the trunk of the outer layer body or by operating the pump. On the other hand, after dispense, the ambient air is introduced between the inner layer body and the outer layer body through an ambient air inlet hole provided in the outer layer body, and the outer layer body can be restored to its original shape while the inner layer body undergoes volume reduction and deformation. As described above, with a delamination container, a content liquid held in the inner layer body can be dispensed without being replaced with the ambient air. Thus contact of the content liquid held in the inner layer body with the ambient air is reduced, and deterioration and change in quality of the content liquid can be suppressed.

The aforementioned delamination container can be produced by forming a tubular parison having a laminate structure and blow molding the parison in a mold. In the laminate structure, an inner body is laminated inside of an outer body by coextrusion molding of an olefin-based synthetic resin material for the outer layer body such as polypropylene (PP) and polyethylene (PE), for example, and a synthetic resin material for an inner layer body such as nylon and ethylene vinyl alcohol copolymer resin (EVOH) having a low compatibility with the synthetic resin material for the outer layer body.

In a dispensing container that uses a delamination container, when the inner layer body separates from the outer layer body and the container undergoes irregular volume reduction and deformation as the content liquid is dispensed therefrom, the inner surfaces of the inner layer body adhere to each other between the mouth and the bottom, which causes a dispensing path of the content liquid to be narrowed or blocked. Thus the dispensing operability may be impaired and the content liquid may not be dispensed to the end.

Therefore, a pair of longitudinal zonal adhesion layers is provided on both sides across an axial center of the container, each of the layers being provided between the outer layer body and the inner layer body to adhere them to each other. Thus deformation of the inner layer body as the content liquid is dispensed is suppressed by these adhesion layers, and the dispensing path can be secured in the inner layer body until the content liquid is used up. Further, a technique is known by which either one of the inner body and the outer body is used as an insert material to injection mold a bottomed tubular preform, and the preform is molded into a delamination container by biaxial stretching blow molding (see, for example, PTL 2). In this case, the inner layer body and the outer layer body of the molded container are assembled at and fixed to a predetermined portion of the trunk in an undercutting manner. CITATION LIST Patent Literature

PTL 1: JP2012116516A
PTL 2: JP2014046966A

SUMMARY

Technical Problem

However, when a preform formed into a laminate structure having an outer body and an inner body is produced by using the insert molding (injection molding), even if an outer layer body and an inner layer body of a container molded from the preform are fixed to a predetermined part of a trunk, a volume reduction state of the inner layer body becomes unstable on the bottom. Thus, when a pump is attached, for example, a flow path of a pipe for pumping is blocked, and dispensing operability may be impaired or the content liquid cannot be dispensed to the end. Thus there is room for improvement of the above problems.

The present disclosure has been conceived in view of the above problems, and the present disclosure is to provide a delamination container that can prevent inner surfaces of an inner layer body from being adhered to each other during use, and a preform used for blow molding of the delamination container.

Solution to Problem

The disclosed delamination container is a synthetic resin delamination container including an outer layer body and an inner layer body peelably laminated on an inner surface of the outer layer body. The container has a tubular mouth, a trunk connected to the mouth, a bottom configured to include a ground contact portion and a recess provided on an axial center side of the ground contact portion and to block a lower end of the trunk, and an engaging protrusion configured to be provided in an area of the bottom, the area extending over at least the ground contact portion and the recess, and to protrude from either one of the outer layer body and the inner layer body and engage with the other one of the outer layer body and the inner layer body in an undercutting manner.

In the disclosed delamination container configured in the aforementioned manner, preferably, the engaging protrusion is provided at least in a pair of areas of the bottom, the areas being opposed to each other across an axial center of the bottom and extending over the ground contact portion and the recess.

In the disclosed delamination container configured in the aforementioned manner, preferably, a cross section vertical to an extending direction of the engaging protrusion is T-shaped.

In the disclosed delamination container configured in the aforementioned manner, preferably, the engaging protrusion is integral with the inner layer body and protrudes from the inner layer body toward the outer layer body.

In the disclosed delamination container configured in the aforementioned manner, preferably, the engaging protrusion extends along the axial center of the mouth and the trunk from the bottom through the trunk to the mouth.

The disclosed preform is a synthetic resin preform used for blow molding, the preform including an outer body and an inner body laminated on an inner surface of the outer body. The preform has a tubular mouth, a trunk connected to the mouth, a bottom configured to block a lower end of the trunk, and an engaging protrusion configured to be provided in an area of the bottom, the area extending at least from a boundary between the bottom and the trunk to just before an axial center of the bottom, and to protrude from either one of the outer body and the inner body and engage with the other one of the outer body and the inner body in an undercutting manner.

In the disclosed preform configured in the aforementioned manner, preferably, the engaging protrusion is provided at least in a pair of areas of the bottom, the areas being opposed to each other across the axial center of the bottom and extending from the boundary between the bottom and the trunk to just before the axial center of the bottom.

In the disclosed preform configured in the aforementioned manner, preferably, a cross section vertical to an extending direction of the engaging protrusion is T-shaped.

In the disclosed preform configured in the aforementioned manner, preferably, the engaging protrusion is integral with the inner body and protrudes from the inner body toward the outer body.

In the disclosed preform configured in the aforementioned manner, preferably, the engaging protrusion extends along the axial center of the mouth and the trunk from the bottom through the trunk to the mouth.

Advantageous Effect

According to the present disclosure, a delamination container that can prevent inner surfaces of an inner layer body from being adhered to teach other during use and a preform used for blow molding of the delamination container can be provided.

DETAILED DESCRIPTION

The present disclosure will be described in more detail below with reference to the drawings.

Figure 1:
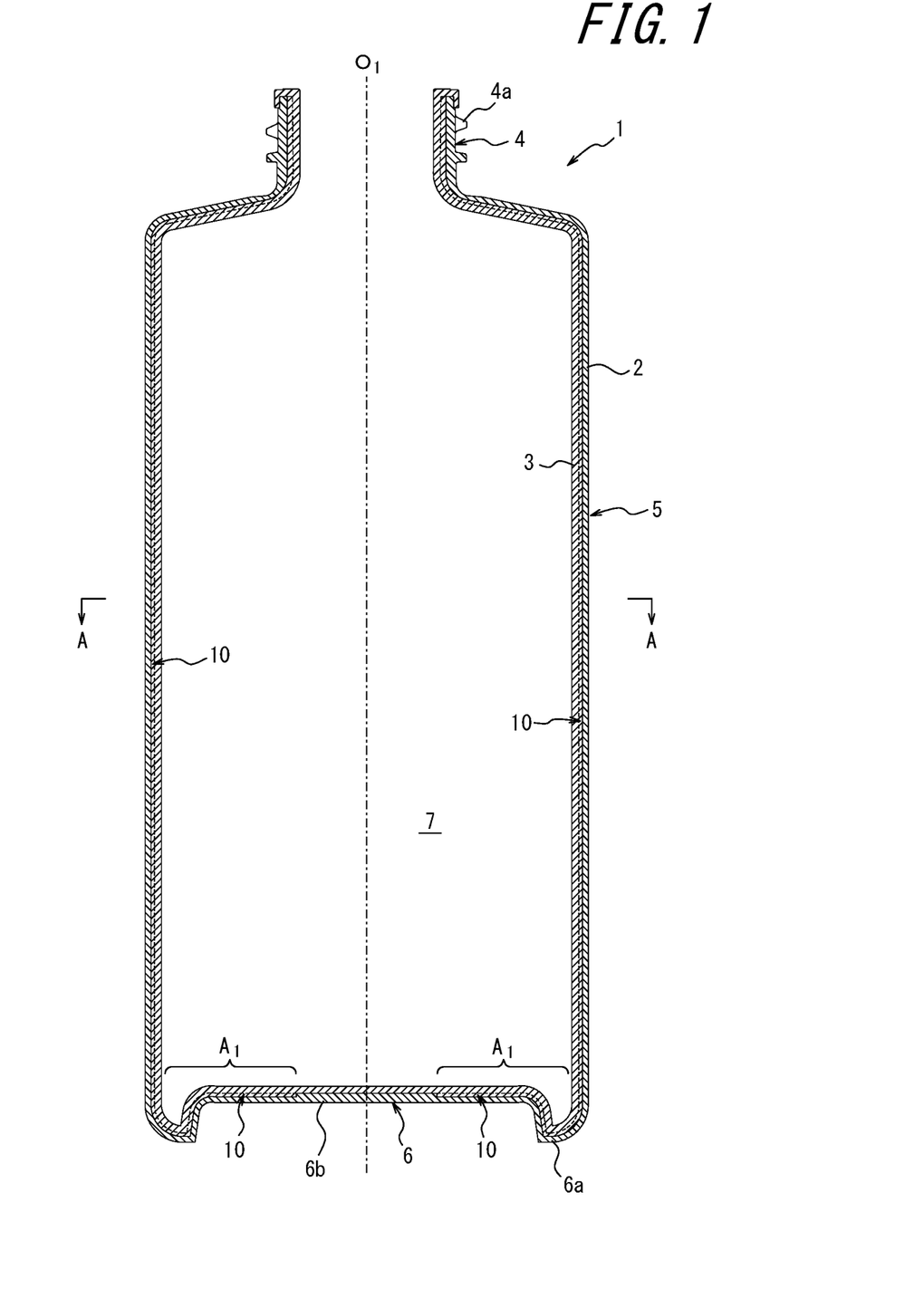
FIG. 1 illustrates a cross-sectional view of a delamination container according to an embodiment of the present disclosure.

The delamination container 1 according to an embodiment of the present disclosure illustrated in FIG. 1 is also called as a peelable laminated container. The container has a double structure in which an outer layer body 2 and an inner layer body 3 are included, and an external shape thereof is a bottle shape having a cylindrical mouth 4, a cylindrical trunk 5 connected below the mouth 4 and a bottom 6 configured to block a lower end of the trunk 5.

The mouth 4 is provided with a male screw 4a to allow for screwing a dispensing member such as a dispensing cap and a dispensing pump therewith to fix to the mouth 4. Further, the bottom 6 includes a ground contact portion 6a configured to annularly protrude downward and a recess 6b provided on the axial center $O_1$ side of the ground contact portion 6a of the bottom 6. The delamination container 1 can be disposed in a standing manner by bringing the ground contact portion 6a in contact with the ground.

It is to be noted that the mouth 4 may include, instead of the male screw 4a, an annular protrusion such that a dispensing member such as a dispensing cap is plugged to be engaged therewith in an undercutting manner.

The case where the delamination container 1 is used as a squeeze type dispensing container is taken as an example and illustrated below.

The outer layer body 2 forms an outer shell of the delamination container 1, and can be formed, for example, by a synthetic resin material such as polypropylene (PP), polyethylene (PE) and polyethylene terephthalate (PET). The portion corresponding to the trunk 5 of the outer layer body 2 is flexible, and can dent when squeezed and restore from the dented state to the original shape. When the delamination container 1 is used as a container with pump, the portion corresponding to the trunk 5 of the outer layer body 2 is not necessarily formed to be squeezable.

The inner layer body 3 is formed into a bag-like shape that is thinner than the outer layer body 2 by using the synthetic resin material of nylon and ethylene vinyl alcohol copolymer resin (EVOH) which has a low compatibility with the synthetic resin material that forms the outer layer body 2. The inner layer body 3 is peelably laminated on the inner surface of the outer layer body 2. The inside of the inner layer body 3 is a holding portion 7 connected to an opening of the mouth 4, and food seasonings such as soy source, beverages, cosmetics such as skin lotion and toiletries such as shampoo, rinse and liquid soap can be held, as a content liquid, in the holding portion 7. It is to be noted that an annular flange configured to radially and outwardly protrude is provided at the opening portion of the inner layer body 3, and the opening portion of the inner layer body 3 is fixed to the open end when the flange is bridged over (mounted on) the open end of the outer layer body 2.

Although not illustrated in detail, the outer layer body 2 is provided with an ambient air inlet hole configured to introduce the ambient air between the outer layer body 2 and the inner layer body 3. Although the ambient air inlet hole can be provided in a position corresponding to the mouth 4 of the outer layer body 2, for example, it can be provided also in the position corresponding to the trunk 5 or in the position corresponding to the bottom 6. In either cases, preferably, the ambient air inlet hole is configured to have a function as a check valve, or it may be configured, with a check valve mounted, to introduce the ambient air between the outer layer body 2 and the inner layer body 3, but not to flow the air out from between the outer layer body 2 and the inner layer body 3. Further, the ambient air inlet hole can be configured to have neither a check valve nor a check valve function.

The delamination container 1 configured in the aforementioned manner can be configured as a dispensing container by attaching a dispensing member such as a dispensing cap to the mouth 4 thereof. In this case, a content liquid can be dispensed from the dispensing member to outside by squeezing a portion corresponding to the trunk 5 of the outer layer body 2, and the inner layer body 3 separates from the inner surface of the outer layer body 2 as the content liquid is dispensed, thus can undergo volume reduction and deformation. When the squeezing is discontinued, the ambient air is introduced from the ambient air inlet hole provided in the outer layer body 2 to between the outer layer body 2 and the inner layer body 3, and thus the outer layer body 2 can be restored to its original shape while the inner layer body 3 undergoes volume reduction and deformation. Therefore, the content liquid held in the holding portion 7 can be dispensed without being displaced with the ambient air. Thus contact of the content liquid held in the holding portion 7 with the ambient air is reduced, and deterioration and change in quality of the content liquid can be prevented.

In the disclosed delamination container 1, in order to prevent the inner layer body 3 from being irregularly volume reduced and deformed as the content liquid is dispensed, an engaging protrusion 10 is provided in an area $A_1$ extending over at least the ground contact portion 6a and the recess 6b of the bottom 6. In the present embodiment, in order to achieve more stable volume reduction and deformation of the inner layer body 3, each of a pair of areas $A_1$ is provided with the engaging protrusion 10, the areas being opposed to each other across at least the axial center $O_1$ of the bottom 6 and extending over the ground contact portion 6a and the recess 6b thereof. The area $A_1$ does not reach the axial center $O_1$ of the bottom 6, and near the axial center $O_1$ of the bottom 6 is not provided with the engaging protrusion 10. In other words, a pair of engaging protrusions 10 is provided only on both sides across the axial center $O_1$ of the bottom 6.

It is to be noted that, in the present embodiment, although the engaging protrusion 10 is not provided near the axial center $O_1$ of the bottom 6, it is not limited thereto, and if the engaging protrusion 10 is provided at least in the area $A_1$, the engaging protrusion 10 may be extended to the axial center $O_1$ of the bottom 6 such that the engaging protrusion 10 is provided up to the part of the axial center $O_1$.

These engaging protrusions 10 are provided to either one of the outer layer body 2 and the inner layer body 3 in a pair of areas $A_1$. In the present embodiment, a case where a pair of engaging protrusions 10 is integrally provided with the inner layer body 3 is illustrated.

Figure 2:
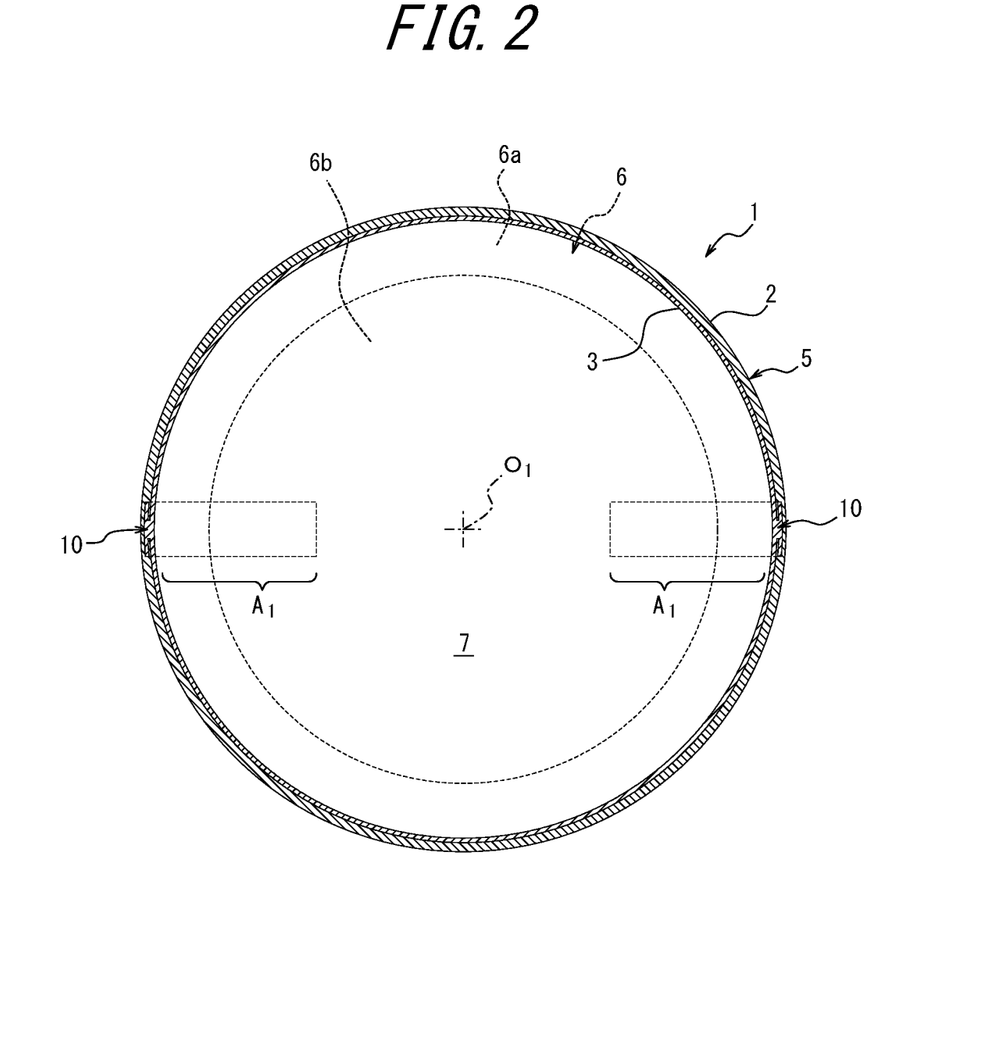
FIG. 2 illustrates a cross-sectional view of the delamination container along A-A line in FIG. 1.

Each of the pair of engaging protrusions 10 extends zonally along a virtual plane that includes the axial center $O_1$ common to the mouth 4, the trunk 5 and the bottom 6, and a cross section (transverse section) thereof vertical to the extending direction is T-shaped as illustrated in FIG. 2. Further, each of the pair of engaging protrusions 10 protrudes from the inner layer body 3 toward the outer layer body 2 and engages with the outer layer body 2 in an undercutting manner. By providing such an engaging protrusion 10, the inner layer body 3 is fixed to the outer layer body 2 in the area $A_1$ of the bottom 6 so that it is not separated from the outer layer body 2. It is to be noted that, in the present embodiment, although the cross-sectional shape of the engaging protrusion 10 is uniform along the extending direction thereof, the cross-sectional shape may be changed along the extending direction.

Figure 3:
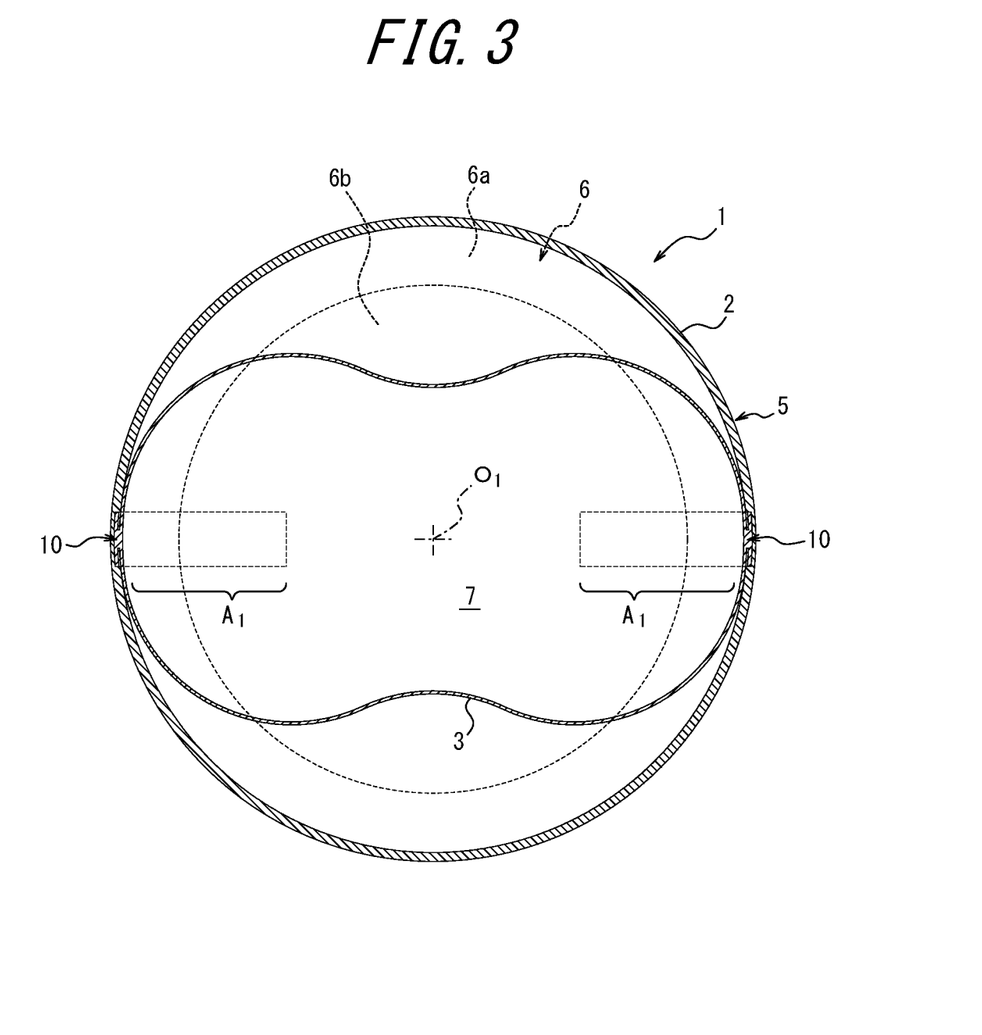
FIG. 3 illustrates a cross-sectional view of an inner layer body that undergoes volume reduction and deformation.

Therefore, as illustrated in FIG. 3, even if the inner layer body 3 undergoes volume reduction and deformation as the content liquid is dispensed, the inner layer body 3 is fixed to the outer layer body 2 by the engaging protrusion 10 in the area $A_1$ on both sides across the axial center $O_1$ of the bottom 6. Thus the inner layer body 3 stably undergoes volume reduction and deformation, and irregular volume reduction and deformation thereof can be prevented. In this manner, without providing a longitudinal zonal adhesion layer between the outer layer body 2 and the inner layer body 3 to adhere them to each other, a pair of engaging protrusions 10 is provided to prevent the dispensing path of the content liquid from being narrowed or blocked due to adhesion of the inner surfaces of the inner layer body 3 between the mouth 4 and the bottom 6 caused by irregular volume reduction and deformation of the inner layer body 3 as the liquid content is dispensed. Thus, the dispensing operability of the delamination container 1 can be maintained and the content liquid held in the holding portion 7 can be dispensed to the end.

Further, a cross section vertical to the extending direction of the pair of engaging protrusions 10 is formed into T-shape. Thus, with a simple structure, the inner layer body 3 can reliably be engaged with the outer layer body 2 in an undercutting manner. Moreover, the inner layer body 3 which is formed thinner than the outer layer body 2 is provided with the pair of engaging protrusions 10. Thus the pair of engaging protrusions 10 can be reliably engaged with the outer layer body 2, which is thicker, in an undercutting manner. Therefore, the pair of engaging protrusions 10 allows the inner layer body 3 to be fitted to the outer layer body 2 in more robust manner.

As illustrated in FIG. 1, in the present embodiment, each of the pair of engaging protrusions 10 is provided not only in the area $A_1$ of the bottom 6, but also along the axial center $O_1$ common to the trunk 5 and the bottom 6 extending from the bottom 6 through the trunk 5 to the mouth 4. In other words, the pair of engaging protrusions 10 is provided not only in the area $A_1$ of the bottom 6, but also on both sides across the axial center $O_1$ of the trunk 5 and the mouth 4.

In this manner, the pair of engaging protrusions 10 is provided not only in the area $A_1$ of the bottom 6 but also on both sides across the axial center $O_1$ of the trunk 5 and the mouth 4, and as a result, as illustrated in FIG. 3, the inner layer body 3 is fixed to the outer layer body 2 not only in the areas $A_1$ on both end sides across the axial center $O_1$ of the bottom 6 but also on both sides of the trunk 5 and the mouth 4. Thus the irregular volume reduction and deformation of the inner layer body 3 as the content liquid is dispensed can be suppressed in all areas over the mouth 4, the trunk 5 and the bottom 6. In this manner, narrowing and blocking of the dispensing path of the content liquid caused by adhesion between the inner surfaces of the inner layer body 3 between the mouth 4 and the bottom 6 can be prevented in more reliable manner.

Figure 4A:
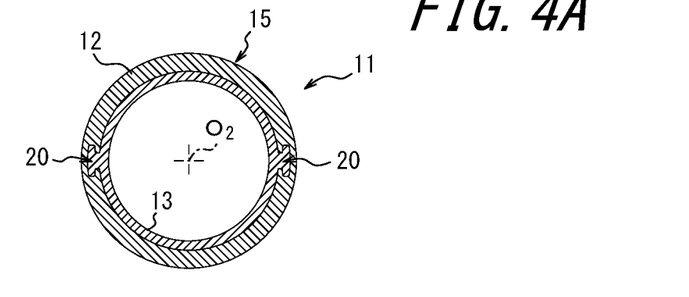
FIG. 4A illustrates a cross-sectional view, along B-B line of FIG. 4B, of a preform according to an embodiment of the present disclosure.
Figure 4B:
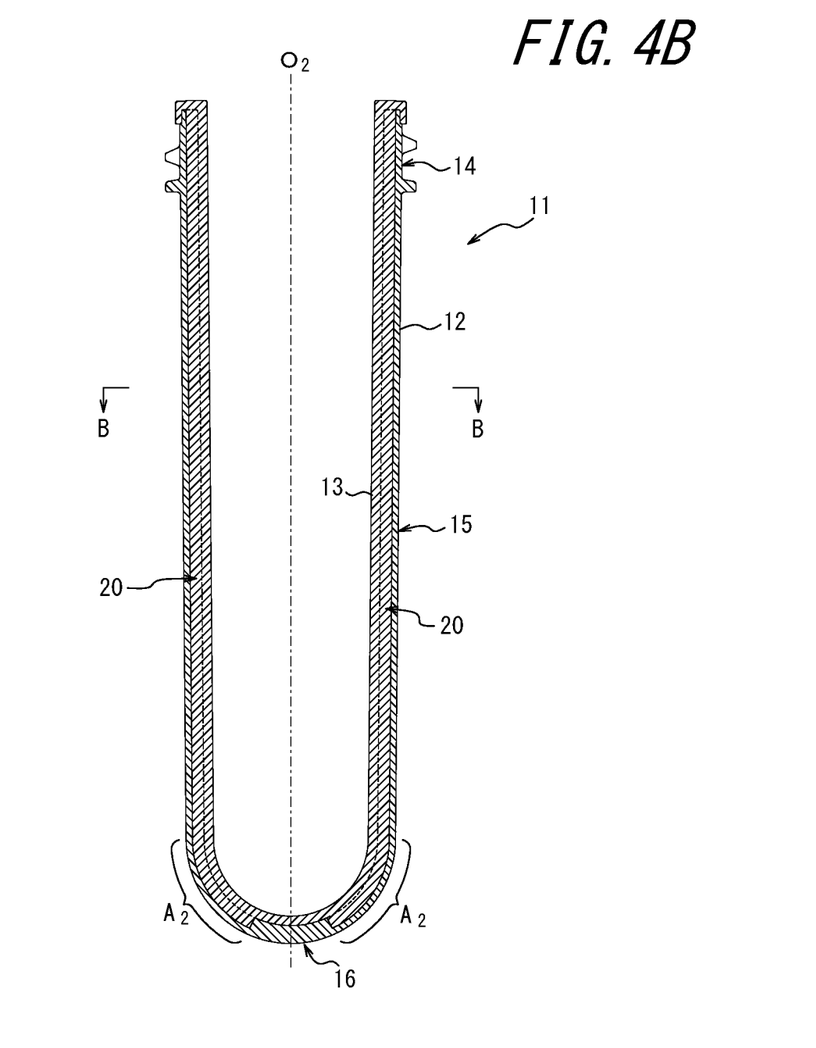
FIG. 4B illustrates a longitudinal cross-sectional view of the preform according to an embodiment of the present disclosure.

The delamination container 1 can be formed by blow molding the synthetic resin preform 11 illustrated in FIG. 4, which is an embodiment of the present disclosure.

The preform 11 has a double structure in which a synthetic resin outer body 12 forming the outer layer body 2 and a synthetic resin inner body 13 forming the inner layer body 3 are included, and the exterior shape thereof is a bottomed tubular shape (substantially test tube shape) having a cylindrical mouth 14, a cylindrical trunk 15 connected below the mouth 14 and a bottom 16 configured to block a lower end of the trunk 15. It is to be noted that the mouth 14 is formed into a shape corresponding to the mouth 4 of the delamination container 1, and the bottom 16 is formed into a curved shape (hemisphere shape).

The outer body 12 is formed by the same synthetic resin materials as those used for the outer layer body 2, that is, synthetic resin materials such as polypropylene (PP), polyethylene (PE) and polyethylene terephthalate (PET). The inner body 13 is also formed by the same synthetic resin materials as those used for the inner layer body 3, that is, synthetic resin materials such as nylon and ethylene vinyl alcohol copolymer resin (EVOH) which has a low compatibility with the synthetic resin material that forms the outer body 12. The inner body 13 is formed thinner than the outer body 12 and is laminated on the inner surface of the outer body 12 such that it covers all over the inner surface.

Corresponding to the pair of engaging protrusions 10 of the delamination container 1, the disclosed preform 11 is provided with engaging protrusions 20 respectively provided in a pair of areas $A_2$. The pair of areas $A_2$ is opposed to each other across at least the axial center $O_2$ of the bottom 16 and extends from the boundary between the bottom 16 and the trunk 15 to just before the axial center $O_2$ of the bottom 16.

Although the preform 11 is formed by injection molding in which an injection molding mold is used, a gate of the injection molding mold is provided at the axial center $O_2$ of the bottom 16 of the preform 11. Thus, the area $A_2$ is provided avoiding the axial center $O_2$ of the bottom 16, and the engaging protrusion 20 is not provided near the axial center $O_2$ of the bottom 16. In this manner, the pair of engaging protrusions 20 is provided only on both end sides across the axial center $O_2$ of the bottom 16.

It is to be noted that, in the present embodiment, the engaging protrusion 20 is not provided near the axial center $O_2$ of the bottom 16 to avoid the gate of the injection molding mold. However, it is not limited thereto, and as long as the engaging protrusion 20 is provided at least in the areas $A_z$, when the gate of the injection molding mold is provided at other positions such as the mouth 14 and the trunk 15, for example, the engaging protrusion 20 may be extended to the axial center $O_2$ of the bottom 16 such that the engaging protrusion 20 is provided up to the part of the axial center $O_z$. Further, the engaging protrusion 20 may also be provided up to the axial center $O_2$ of the bottom 16, which will serve as a gate of the injection molding mold.

These engaging protrusions 20 are provided to either one of the outer body 12 and the inner body 13 in a pair of areas $A_2$. In the present embodiment, a case where a pair of engaging protrusions 20 is integrally provided with the inner body 13 is illustrated.

Each of the pair of engaging protrusions 20 extends zonally along a virtual plane that includes the axial center $O_2$ common to the mouth 14, the trunk 15 and the bottom 16, and as illustrated in FIG. 4A, a cross section vertical to the extending direction thereof is T-shaped. Further, each of the pair of engaging protrusions 20 protrudes from the inner body 13 toward the outer body 12 and engages with the outer body 12 in an undercutting manner. It is to be noted that the cross-sectional shape of the engaging protrusion 20 is uniform along the extending direction thereof.

As illustrated in FIG. 4B, in the present embodiment, each of the pair of engaging protrusions 20 is provided not only in the area $A_2$ of the bottom 16, but also extending along the axial center $O_2$ common to the trunk 15 and the bottom 16 from the bottom 16 through the trunk 15 to the mouth 14. In other words, the pair of engaging protrusions 20 is provided not only in the area $A_2$ of the bottom 16 but also on both sides across the axial center $O_2$ of the trunk 15 and the mouth 14.

Figure 5A:
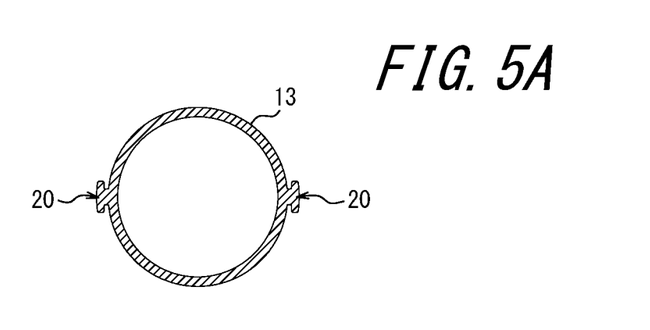
FIG. 5A illustrates a cross-sectional view, along C-C line of FIG. 5B, of an inner body used for insert molding of the preform illustrated in FIG. 4.
Figure 5B:
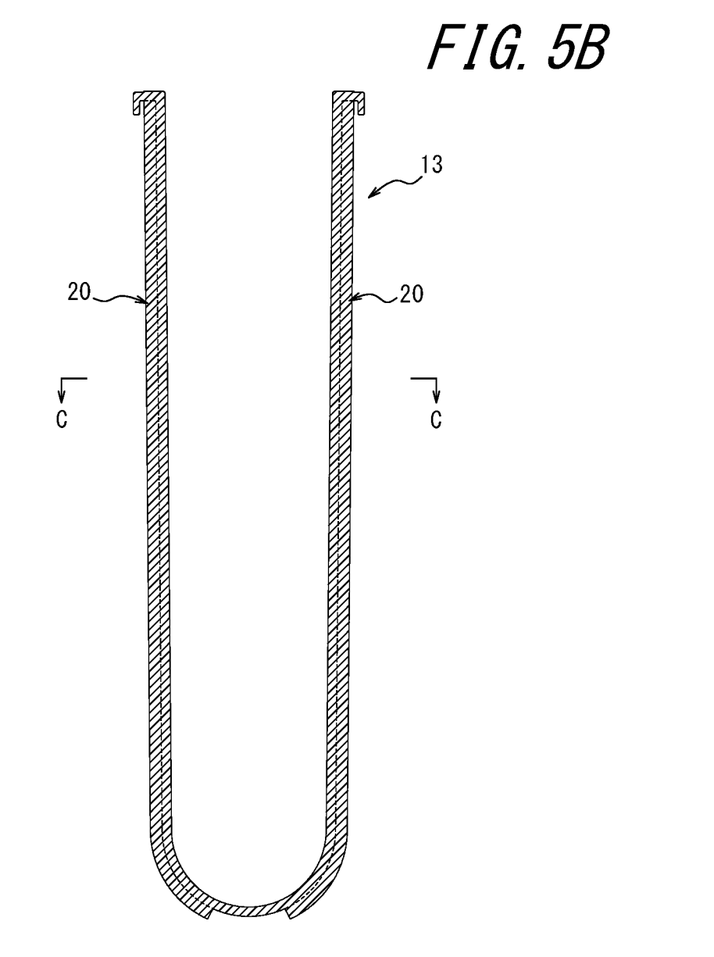
FIG. 5B illustrates a longitudinal cross-sectional view of the inner body used for insert molding of the preform illustrated in FIG. 4.

The preform 11 configured in the aforementioned manner can be formed by insert molding in which the inner body 13 illustrated in FIG. 5 is used as an insert material. In other words, the inner body 13 formed in advance in a predetermined shape provided with a pair of engaging protrusions 20 by injection molding or the like is disposed in a predetermined position of the injection molding mold, and in this state, a synthetic resin material for molding the outer body 12 is injected into the injection molding mold. In this manner, the preform 11 can be formed in which the inner body 13 is laminated on the inner surface of the outer body 12 such that the outer body 12 is engaged with the pair of engaging protrusions 20 in an undercutting manner. In this manner, the preform 11 in which the pair of engaging protrusions 20 is engaged with the outer body 12 in an undercutting manner can be easily produced by insert molding in which the inner body 13 provided with the pair of engaging protrusions 20 is used as an insert material. In this case, injection molding of the inner body 13 to be used as an insert material and insert molding of the preform 11 in which the inner body 13 is used as an insert material may be performed in one mold. Alternately, after injection molding of the inner body 13 to be used as an insert material, the inner body 13 may be transferred to another mold for insert molding and therein the preform 11 may be insert molded.

The delamination container 1 illustrated in FIG. 1 can be produced by blow molding the aforementioned perform 11.

Figure 6:
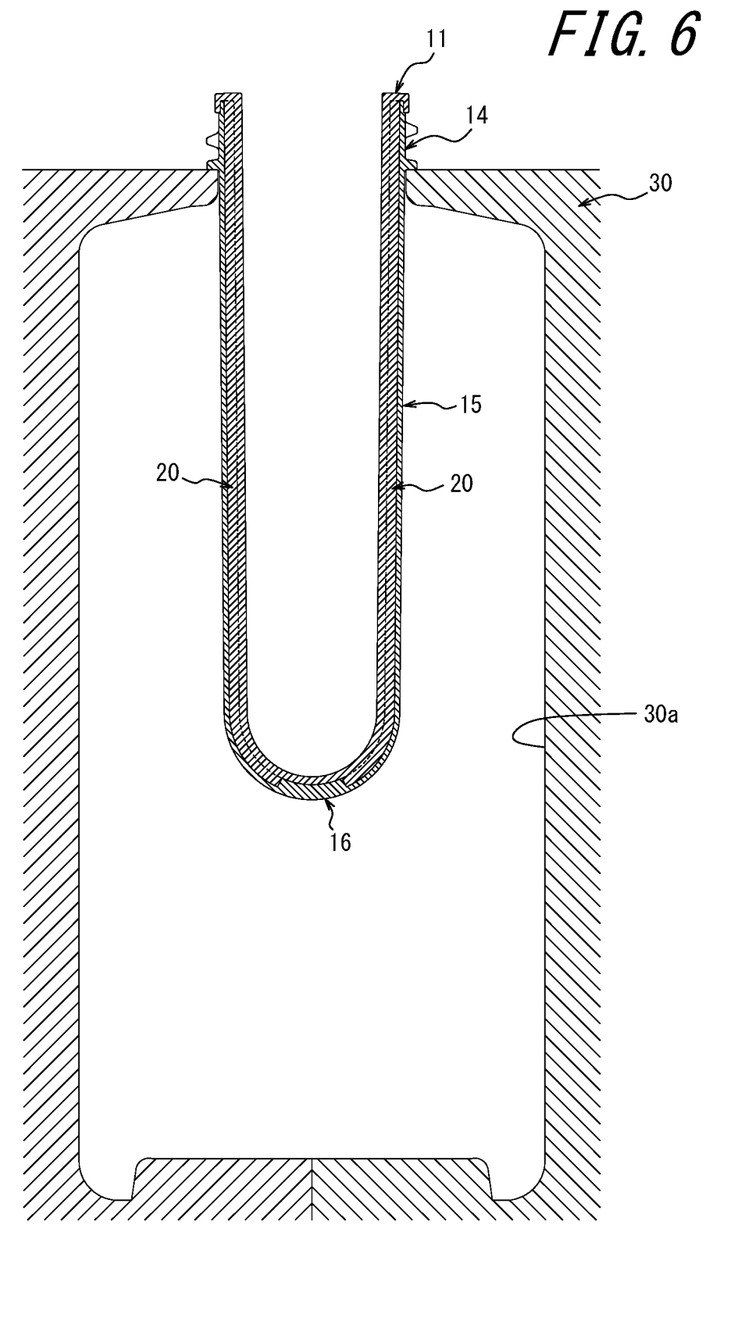
FIG. 6 is a cross-sectional view illustrating a state where the preform illustrated in FIG. 4 is disposed in a mold for blow molding.
Figure 7:
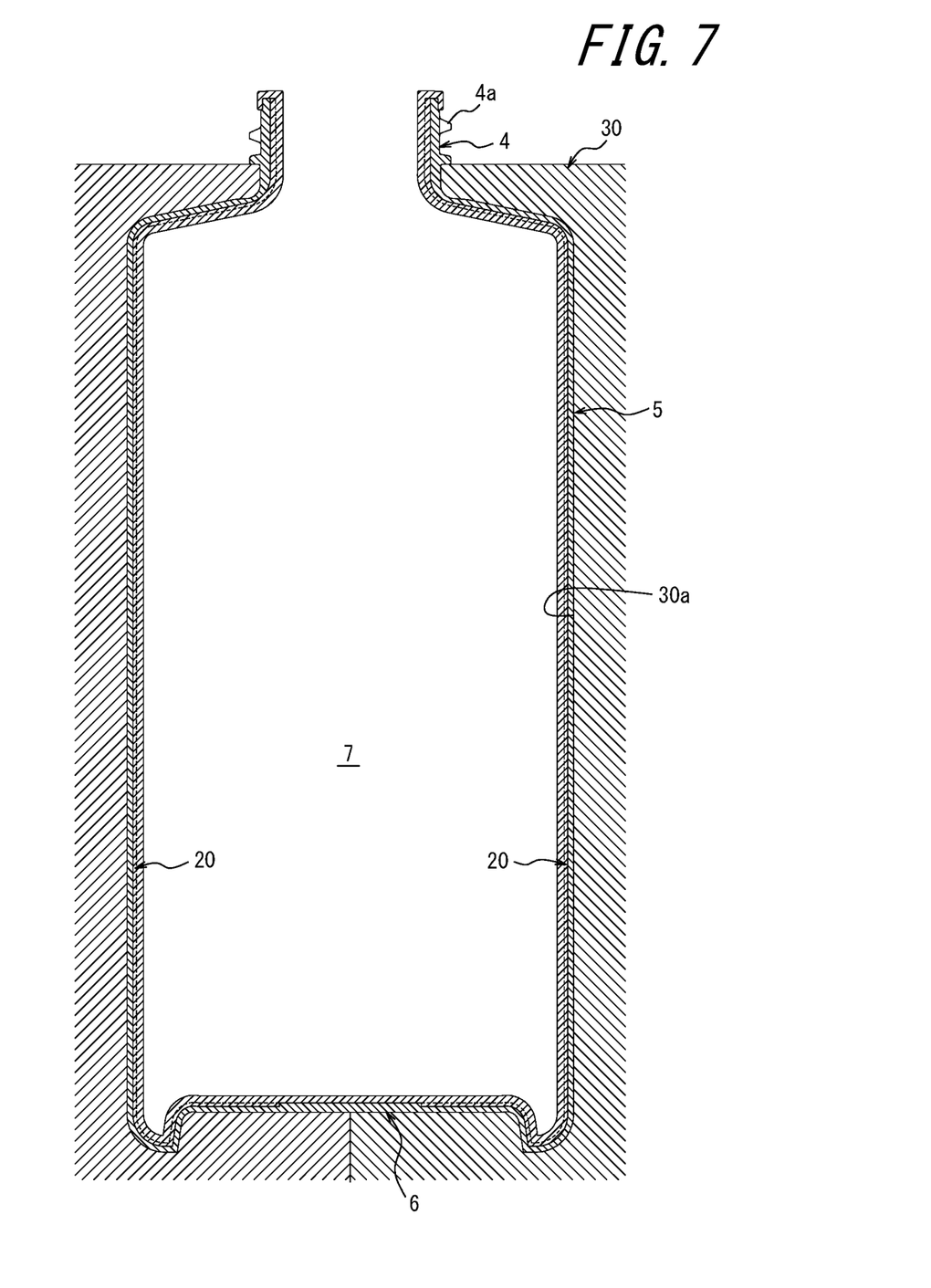
FIG. 7 is a cross-sectional view illustrating a state where the preform illustrated in FIG. 6 is molded into a delamination container by blow molding.

In other words, as illustrated in FIG. 6, the preform 11 is set in a mold for blow molding 30 that constitutes the blow molding apparatus such that the mouth 14 projects from the cavity 30a and the trunk 15 and the bottom 16 are positioned in the cavity 30a, and in this state, pressurizing medium such as pressurized air and pressurized liquid for blow molding is supplied from a supply device not illustrated through its mouth 14 into the preform 11. In this manner, as illustrated in FIG. 7, the preform 11 is blow molded into a shape conforming to an inner surface of the cavity 30a and can be formed into the delamination container 1. In this case, biaxial stretching blow molding by which a pressurizing medium is supplied while the preform 11 is longitudinally stretched by using a stretching rod can be adopted.

It goes without saying that the present disclosure is not limited to the aforementioned embodiment, and various changes may be made without departing from the gist of the present disclosure.

For example, in the delamination container 1 according to the aforementioned embodiment, although a pair of engaging protrusions 10 is provided to the inner layer body 3, a pair of engaging protrusions 10 may be provided to the outer layer body 2. In the same manner, in the preform 11 according to the aforementioned embodiment, although a pair of engaging protrusions 20 is provided to the inner body 13, a pair of engaging protrusions 20 may be provided to the outer body 12.

Further, in the delamination container 1 according to the aforementioned embodiment, although a pair of engaging protrusions 10 is provided, only one engaging protrusion 10 or three or more engaging protrusions 10 may be provided. In the same manner, in the preform 11 according to the aforementioned embodiment, although a pair of engaging protrusions 20 is provided, only one engaging protrusion 20 or three or more engaging protrusions 20 may be provided.

Moreover, in the delamination container 1 according to the aforementioned embodiment, although the engaging protrusion 10 is configured to extend from the bottom 6 through the trunk 5 to the mouth 4, it is not limited thereto, and as long as the engaging protrusion 10 is provided in the area $A_1$ of the bottom 6, it may be configured to extend to the trunk 5 but not reach the mouth 4, or it may be configured to extend to the middle of the trunk 5. Thus the area in which the engaging protrusion 10 is disposed can be changed in various manners. In the same manner, in the preform 11 according to the aforementioned embodiment, although the engaging protrusion 20 is configured to extend from the bottom 16 through the trunk 15 to the mouth 14, it is not limited thereto, and as long as the engaging protrusion 20 is provided in the area $A_2$ of the bottom 16, it may be configured to extend to the trunk 15 but not reach the mouth 14, or it may be configured to extend to the middle of the trunk 15. Thus the area in which the engaging protrusion 20 is disposed can be changed in various manners.

Moreover, in the delamination container 1 according to the aforementioned embodiment, although the mouth 4 and the trunk 5 can be formed into a cylindrical shape, it is not limited thereto, and it may be formed into a square tubular shape or an elliptic cylindrical shape, for example. In the same manner, in the preform 11 according to the aforementioned embodiment, although the mouth 14 and the trunk 15 can be formed into a cylindrical shape, it is not limited thereto, and it may be formed into a square tubular shape or an elliptic cylindrical shape, for example.

REFERENCE SIGNS LIST

1 Delamination container
2 Outer layer body
3 Inner layer body
4 Mouth
4a Male screw
5 Trunk
6 Bottom
6a Ground contact portion
6b Recess
7 Holding portion
10 Engaging protrusion
11 Preform
12 Outer body
13 Inner body
14 Mouth
15 Trunk
16 Bottom
20 Engaging protrusion
30 Mold
30a Cavity
$O_1$ Axial center
$O_2$ Axial center
$A_1$ Area
$A_2$ Area

The invention claimed is:

1. A synthetic resin delamination container comprising an outer layer body and an inner layer body peelably laminated on an inner surface of the outer layer body, the delamination container having:
   a tubular mouth;
   a trunk connected to the mouth;
   a bottom configured to include a ground contact portion and a recess provided on an axial center side of the ground contact portion and to block a lower end of the trunk; and
   an engaging protrusion provided in an area of the bottom, the area extending over at least the ground contact portion and the recess, and configured to protrude from either one of the outer layer body and the inner layer body and engage with the other one of the outer layer body and the inner layer body in an undercutting manner,
   wherein the engaging protrusion extends along the axial center of the mouth and the trunk from the bottom through the trunk to the mouth, and
   wherein the engaging protrusion is integrally provided with the inner layer body and protrudes from the inner layer body toward the outer layer body.

2. The delamination container according to claim 1, wherein the engaging protrusion is provided at least in a pair of areas of the bottom, the areas being opposed to each other across the axial center of the bottom and extending over the ground contact portion and the recess.

3. The delamination container according to claim 1, wherein a cross section vertical to an extending direction of the engaging protrusion is T-shaped.

4. A synthetic resin preform used for blow molding comprising an outer body and an inner body laminated on an inner surface of the outer body, the preform having:
   a tubular mouth;
   a trunk connected to the mouth;
   a bottom configured to block a lower end of the trunk; and
   an engaging protrusion provided in an area of the bottom, the area extending over at least from a boundary between the bottom and the trunk to just before an axial center of the bottom, and configured to protrude from either one of the outer body and the inner body and engage with the other one of the outer body and the inner body in an undercutting manner,
   wherein the engaging protrusion extends along the axial center of the mouth and the trunk from the bottom through the trunk to the mouth, and
   wherein the engaging protrusion is integrally provided with the inner body and protrudes from the inner body toward the outer body.

5. The preform according to claim 4, wherein the engaging protrusion is provided at least in a pair of areas being opposed to each other across the axial center of the bottom and extending from the boundary between the bottom and the trunk to just before the axial center of the bottom.

6. The preform according to claim 4, wherein a cross section vertical to an extending direction of the engaging protrusion is T-shaped.

* * * * *